G. PHILLIPS.

ROCK-DRILL.

No. 7,226. Reissued July 18, 1876.

Witnesses
John Becker
Fred. Haynes

George Phillips
by his Attorneys
Brown & Allen

UNITED STATES PATENT OFFICE.

GEORGE PHILLIPS, OF CADET, MISSOURI, ASSIGNOR TO GEORGE H. ROBINSON, OF NEW YORK CITY.

IMPROVEMENT IN ROCK-DRILLS.

Specification forming part of Letters Patent No. 84,576, dated December 1, 1868; reissue No. 7,226, dated July 18, 1876; application filed June 20, 1876.

*To all whom it may concern:*

Be it known that I, GEORGE PHILLIPS, of Cadet, in the county of Washington and State of Missouri, have invented certain new and useful Improvements in Drilling-Machines, of which the following is a full, clear, and exact description, reference being had to the accompanying drawing, which forms part of this specification, and in which—

Figure 2:
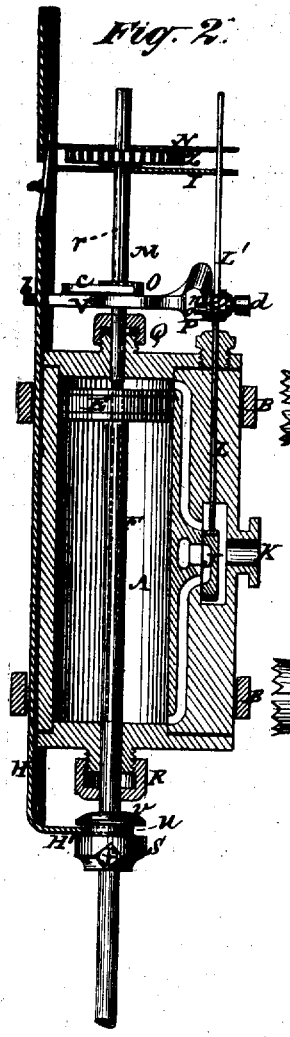
Figure 1:
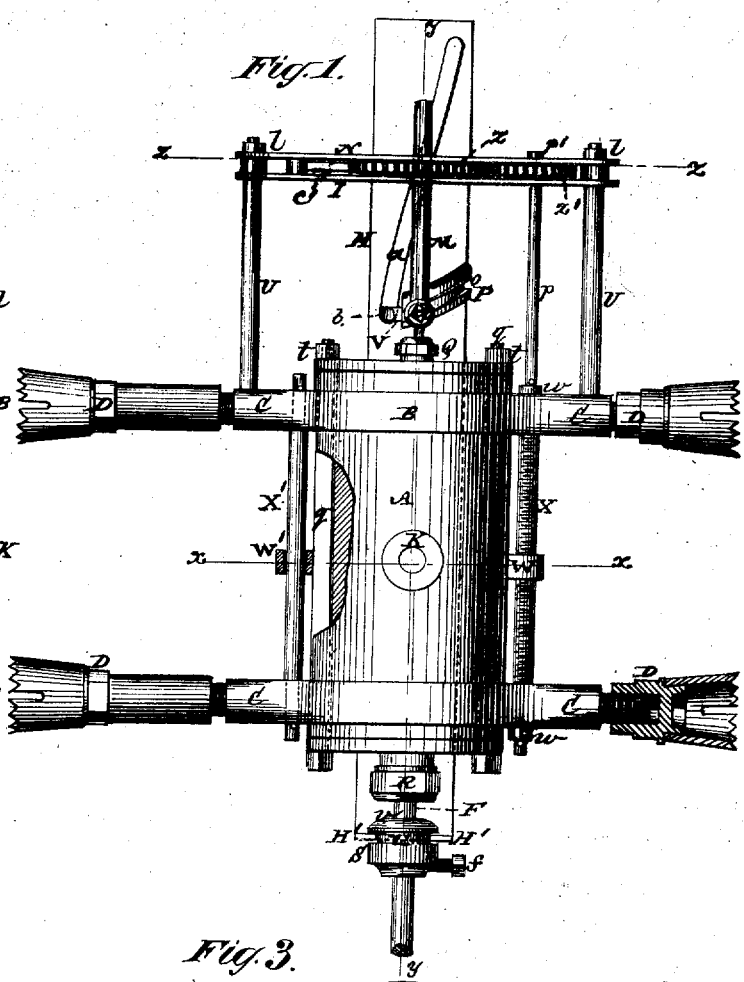
Figure 3:
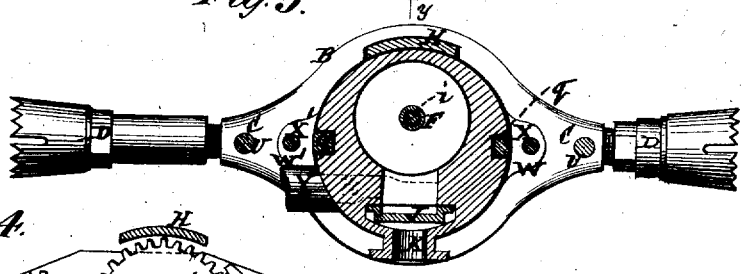
Figure 4:
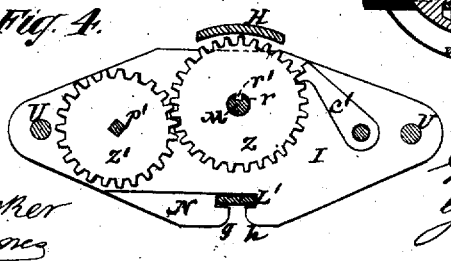

Figure 1 is a partly broken longitudinal view of a rock-drilling machine constructed in accordance with my invention. Fig. 2 is a longitudinal section of the same on the line *x x*. Fig. 3 is a transverse section thereof on the line *y y*; Fig. 4, a further transverse section, in part on the line *z z*, showing a certain rear plate and gearing used in the machine.

This invention is more particularly designed for apparatus or machines used in drilling rock for wells, deep blasts, and other purposes, and in which a piston moving in a cylinder, and actuated by steam or compressed air, is used to work the drill which is attached to the piston-rod.

The invention consists in various combinations with said drill-piston and its cylinder of certain devices, substantially as hereinafter described, for more effectually controlling and regulating the operation of the drill.

The invention also consists in certain novel connections for re-enforcing the cylinder, in which the piston of a drill-carrying piston-rod works, whereby breakage of the cylinder or its front head is avoided, and a lighter cylinder may be used, essentially as hereinafter described.

A is the cylinder of the machine, which, for the purpose of illustration, is here supposed to occupy an upright position, and to be engaged in drilling downward, and the several parts of the machine and their operation will be described accordingly. This cylinder A is fitted to slide with finished contact, or in a guided manner, within metal guides B, having arms or supports C, as shown. These arms or supports terminate in screw-jacks D, which are for the purpose of affixing said arms between suitable resisting-surfaces, for the purpose of supporting the cylinder and its attachments. These screw-jacks may be of any suitable construction. E is the piston, which works within the cylinder A. The rod F of said piston is made hollow, and incloses a reduced extension or prolonged portion of a ratchet-rod, M, which latter fits steam-tight through the stuffing-box Q of the cylinder, and is rotated slowly at each downward or striking stroke of the drill by mechanism, as hereinafter described. S is the drill-holder on the piston-rod F, and provided with a set-screw, *f*, which holds the drill firmly, so that the drill, the hollow piston rod F, and the piston E all rotate together a short distance at each downward or drilling stroke of the piston, whereby the edge of the drill is presented in a differept radial direction to that assumed by it in the preceding blow, which conduces to the boring effect. J is the valve by which the reciprocating motion of the piston E is controlled.

The mechanism for operating said valve, and for producing the rotation of the drill, will now be described.

H is a slide-bar, which is fitted to move longitudinally within or through the bands B, as shown in Figs. 2 and 3. The lower or front end of this slide-bar is provided with projections H′ H′, made by giving said end a fork-like construction and bending the same, as shown. This forked end fits within an annular groove, *u*, in the drill-holder S, so that the latter and a flange, *v*, of the same cause the said slide-bar to move up and down with the piston and drill.

The slide-bar H extends beyond the top or rear end of the cylinder, as shown, and has an oblique slot, *a*, cut in it. A lever, V, works with easy contact on the ratchet or drill turning rod M. This lever carries a pawl, which is controlled by a spring, *c*, to cause it to press upon a ratchet-pinion, O, arranged on the rod M, said pinion being restrained from lateral motion on said rod by a set-screw, the point of which enters a longitudinal slot, *r*, in the rod. By this slot and set-screw the ratchet-pinion O is permitted to move along on the rod M, with the lever V, as the cylinder is lowered slightly at each stroke of the drill to give the necessary feed to the latter.

The oblique slot *a* in the slide-bar H causes the lever V to be operated by means of a reduced end, *b*, of the lever entering within said slot, as shown, whereby, as the slide-bar H moves up and down, the lever is vibrated, and its pawl caused to catch on the loose ratchet-pinion O, as in other ratchet-driven devices, and thereby to rotate the rod a short distance at each double stroke of the piston.

The piston is made to follow the rotation of the rod M by means of a flat face on the reduced extension of the latter, as shown at *i*, Fig. 3, the bore of the piston-rod, in which said extension fits, being formed with a corresponding flat face to fit the face on the extension *i*, so that the rod F and its piston shall turn with the rod M, as stated.

Other equivalent devices may be employed to accomplish the same result—as, for example, the rod F may be provided with a set-screw arranged to fit the groove or slot occupying the place of the aforesaid flat face. The bore of the rod F and the surface of the extension *i* may be correspondingly fluted, or be of any corresponding angular sectional construction.

That end of the lever V which is opposite to the end *b* is formed with a slotted head, P, the slot therein running obliquely or upward, as shown at *o*, Fig. 1, and in this slot a stud or projection, *n*, from a block, *e*, (which latter is clamped to a guide-rod, L, by a set-screw, *d*,) is arranged to work.

By this device the valve-rod and its valve J have the requisite motion given them, at each stroke of the piston, to admit and exhaust steam or air for operating the latter. The block *e* can be adjusted up or down on the rod L to give lead at either end of the cylinder, as required.

The mechanism for feeding the drill, or for causing the cylinder A to descend slightly within the bands B at each stroke of the drill, will now be described.

The cylinder fits in a smooth manner within the bands B, and is firmly supported at any one point by a screw, X, which works in a lug, W, fast to the cylinder. This screw has a plain extension, *p*, which carries at its back or upper end a toothed wheel, Z′, which engages with another toothed wheel, Z, that is turned by the rod M. The wheel Z is not firmly keyed on the rod M, but is held from turning on said rod by a tongue, *r*′, in the eye of the wheel, which tongue fits in the slot *r* of the rod M, as shown in Fig. 4. The wheel Z is accordingly made to revolve with the rod M, and permits of the latter working longitudinally, or up and down, when the cylinder is moved longitudinally.

By the co-operative action of the above-described devices, the drill is made to rotate a small distance at each downward stroke of the same, and also the cylinder to descend a small increment of space within its bands B at each downward stroke of the drill, whereby the drilling of rock will be accomplished automatically by the action of the operating vapor or fluid, without interruption, or in a regular or systematic manner, the turning of the rod M rotating the piston and drill, and the turning of the screw X, by the interposed wheels Z Z′, feeding the drill by longitudinally sliding the cylinder. Thus, the feed of the drill conjointly with its rotation is effected by connecting gears.

On the opposite side of the cylinder A to that occupied by the screw X is a rod, X′, tapped in or otherwise secured to the arms C. This rod serves as a guide for a lug, W′, fast to the cylinder to travel on, and thereby to steady the movement of the cylinder.

The wheels Z Z′ are located between plates N and I, which plates are held by uprights or pillars U U, tapped into the arms C. The plates N and I are separated by thimbles and held in place by nuts *l l*, as shown. The back or upper plate serves to provide bearings for the rod M, and for the shaft or screw extension *p*; but the front or lower plate I supports the loose wheel Z, which otherwise would slip downward on the rod M. Projections *h* and *g* on these plates form guides, as shown at Fig. 4, for the guide-rod L′ of the valve-rod L. A pawl, *c*′, catches in the teeth of the wheel Z, and serves as an auxiliary pawl to hold the rod M from turning backward, when the drill, striking any hard part of the rock, glances and brings the strain upon the ratchet-pinion and its small pawl. Collars *w w* on the screw-rod X hold said rod in place, the upper collar sustaining, for the most part, the weight of the cylinder. The lever V fits smoothly upon the rod M, and may rest upon the cap Q of the back or top stuffing-box. R is the front or lower stuffing-box. In Fig. 4 a small part of the upper plate is shown at N.

When the cylinder has descended to the length of its limit, which is when the top of the rod M is even with the plate N, the cylinder is again elevated to its normal position, by means of a crank fitting in a square arbor, *p*′, of the shaft or screw extension *p*, Figs. 1 and 4.

The valve-chest of the cylinder is situated within the exterior surface of the body of the cylinder, as shown, so that the latter may have motion up or down within the bands B, the bore of the cylinder having an eccentric relation to the whole body of metal, to allow room for the valve-chest and ports, as shown.

To prevent breakage of the front or lower head of the cylinder, or of the latter by the heavy blow that the lower head receives when the drill is not striking rock, and at the same time to provide for using a light working cylinder, which is an important consideration in rock-drills, by reason of their necessary portability, I use re-enforcing connections for the cylinder by holding the cylinder-heads to their places and tying them together by bolts *q*, arranged to run throughout the whole length of the cylinder, and secured by nuts *t*. These bolts *q* are subject to tensile strain when the piston strikes the front cylinder-head, while the strain transmitted to and through the cylinder is a crushing one. This is the best possible application of such strain, inasmuch as the bolts, being made of wrought-iron, have a greater tensile strength than cast-iron, and the cylinder, being of cast metal, has a greater power of resisting compression than wrought-iron.

A rock-drill constructed in accordance with this invention combines simplicity and durability, and is comparatively inexpensive, and is both rapid and effective in its operation.

I claim—

1. The slide-bar H, with its oblique slot *a*, and the lever V, with its slotted head P, in combination with the stud *n*, for the purpose of operating the valve of a drilling-machine by the piston-rod of the same, substantially as shown and described.

2. The ratchet-pinion O, in combination with the ratchet-rod M, slide-bar H, lever V, and piston-rod F, of a drilling-machine, all operating substantially as shown and described, to rotate the drill G of a drilling-machine, in the manner set forth.

3. The combination, with the valve guide-rod L′ and the plates N I, which contain between them the gearing for feeding the drill, of lugs *g h* on the said plates, forming guides for the said rod, substantially as herein described.

4. The combination, with the cylinder, in which works the piston of a drill-carrying piston-rod, of the re-enforcing connections or bolts *q*, substantially as shown and described.

GEORGE PHILLIPS.

Witnesses:
J. V. RANDOLPH,
THOMAS YATES.